April 8, 1924.
F. E. SMALL
PISTON PACKING
Filed March 6, 1923
1,489,464
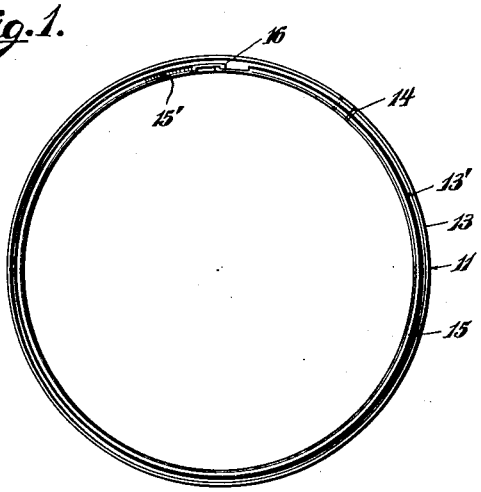
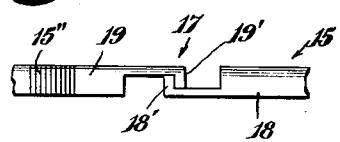
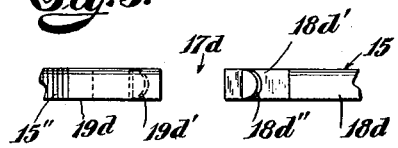
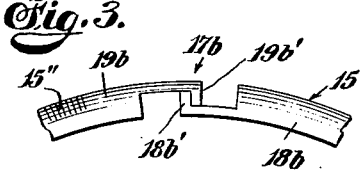
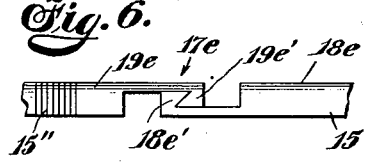
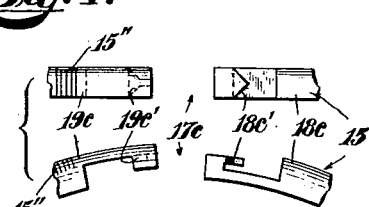
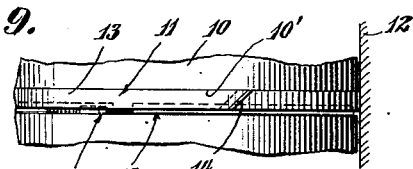
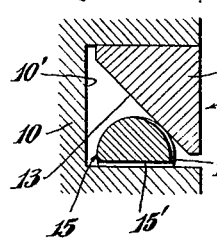
INVENTOR
Frank E. Small
BY Edward M. Evarts
his ATTORNEY Patented Apr. 8, 1924.

1,489,464

UNITED STATES PATENT OFFICE.

FRANK E. SMALL, OF JAMAICA, NEW YORK.

PISTON PACKING.

Application filed March 6, 1923. Serial No. 623,096.

*To all whom it may concern:*

Be it known that I, FRANK E. SMALL, a citizen of the United States, and a resident of Jamaica, Queens County, New York, have invented an Improvement in Piston Packings, of which the following is a specification.

My present invention relates to piston packings, intended particularly, but not exclusively, for the pistons of internal combustion engines. While not necessarily limited thereto, my invention applies more especially to piston packings consisting of a split resilient packing ring in combination with a split resilient follower ring, and aims to provide piston packings of the character designated above which shall be so constructed and arranged as to prevent the follower ring from jumping out of the piston groove during or after installation, while still permitting the packing and follower rings, and thus the piston packing as a whole, to have the desired degree of radial or diametrical expansion. It is a further object of the present invention to provide means of the general character designated above whereby the spring follower ring will not be permitted to creep or move circumferentially with respect to the piston groove in which it is installed, or with respect to the packing ring with which it is associated, thus substantially preventing the packing as a whole from creeping or moving circumferentially in the piston groove in which it is installed.

In the accompanying specification I shall describe, and in the annexed drawing show, several illustrative embodiments of the present invention. It is however, to be clearly understood that my invention is not limited to the embodiments thereof herein shown and described for purposes of illustration only.

Referring to the drawing, wherein the aforesaid illustrative embodiments are illustrated:

Fig. 1 is a top plan view of one form of spring follower ring constructed in accordance with the principles of the present invention;

Fig. 2 is a detail perspective view of one form of locking means that may be employed in connection with the spring follower ring shown in Fig. 1 of the drawing;

Fig. 3 is a view similar to Fig. 2 of another form of locking means;

Fig. 4 is a view similar to Fig. 2 of still another form of locking means;

Fig. 5 is a view similar to Fig. 2 of another embodiment of locking means that may be employed with a spring follower ring of the type shown in Fig. 1 of the drawing;

Fig. 6 is a view similar to Fig. 2 of still another embodiment of locking means;

Fig. 7 is a view similar to Fig. 2 of still another form of locking means;

Fig. 8 is a cross sectional view on an enlarged scale showing the piston packing of the present invention, as more particularly illustrated in Figs. 1 and 2 of the drawing, installed in a piston groove; and Fig. 9 is a side view, partly in cross section, of the piston packing of Figs. 1, 2 and 8, shown installed in the piston groove, and the piston within the engine cylinder.

Referring now more particularly to the embodiment of the present invention shown in Figs. 1, 2, 8 and 9 of the drawing, 10 indicates a piston having a groove 10' within which is the piston packing generally indicated by reference character 11, the piston and the packing or packings carried thereby being reciprocatable within the engine cylinder 12.

The packing 11 consists of a resilient packing ring 13 split at one point thereof, as at 14, cooperating with a spring follower ring 15 split as at 16. The packing ring 13 is preferably provided with a bearing surface at an inner portion thereof, such as the beveled bearing surface 13' extending along a portion at least of the inner face of the packing ring 13.

The spring follower ring 15 is provided, at the split portion 16 thereof, with means for locking the split ends of the ring, so as to permit diametrical expansion of the ring without separation of the ends thereof. For this purpose of locking the split ends of the ring against circumferential separation, and also against transverse displacement, I provide the ends of the spring follower ring 15, at the split portion 16 thereof, with locking means generally designated by reference character 17. In the form shown in Figs. 1, 2 and 9 of the drawing, the locking means 17 comprises hooking means in the form of a depending portion 18' on the end 18 of the spring follower ring 13, and in the form of a cooperating upstanding portion 19' at the end of the remaining end portion 19 of the spring follower ring. As shown more clearly in Figs. 2 and 9 of the drawing, the hooking portions 18' and 19' cooperate to limit the diametrical expansion of the spring follower ring, for the purposes already specified above.

The locking or hooking means shown in Fig. 3 of the drawing, and generally designated by reference character 17$^b$, instead of being provided in the upper and lower face portions of the spring follower ring, as in the case of the form of locking or hooking means shown in Figs. 1, 2 and 9 of the drawing, are provided in the side faces of the spring follower ring and comprise the opposed overlapping hooking portions 18$^{b'}$ and 19$^{b'}$, forming parts of the end portions 18$^b$ and 19$^b$ of the spring follower ring.

In Fig. 4 of the drawing I have shown locking or hooking means in the form of a dove-tail lock or joint, intended to prevent transverse as well as circumferential separation of the ends of the ring. In this form of locking or hooking means, generally designated by reference character 17$^c$, the end 18$^c$ of the follower ring is provided with a substantially triangularly shaped portion 18$^{c'}$ for cooperation with a channel or key-way 19$^{c'}$ intermediate the raised portions 19$^c$ at one end of the follower ring. It will be apparent that the point of the substantially triangularly shaped portion 18$^{c'}$ will wedge into the channel or key-way 19$^{c'}$ to lock the spring follower ring against transverse or lateral displacement as well as against too great circumferential expansion, with consequent danger of the separation of the ends of the spring follower ring.

In Fig. 5 of the drawing the locking or hooking means, generally designated by reference character 17$^d$, comprises an undercut tongue-like portion 18$^{d'}$ having the rounded overhanging tongue member 18$^{d''}$ at one end 18$^d$ of the spring follower ring. The other end 19$^d$ of the spring follower ring is provided with a similarly undercut groove portion 19$^{d'}$ for the reception of the tongue 18$^{d''}$. In this way the ends of the spring follower ring are locked not only against too great circumferential expansion, with consequent danger of the separation of the ends of the follower ring, but also against transverse or lateral displacement of the ends of the spring follower ring.

In Fig. 6 of the drawing the locking or hooking means, generally designated by reference character 17$^e$, is shown as comprising an undercut hook portion 18$^{e'}$ at one end 18$^e$ of the spring follower ring, for cooperation with a similar hook-shaped portion 19$^{e'}$ at the other end 19$^e$ of the spring follower ring. These hook portions 18$^{e'}$ and 19$^{e'}$ are so constructed and arranged as to permit the locking of the ends of the ring against too great circumferential displacement, with consequent possibility of the ends of the follower ring being separated.

In Fig. 7 of the drawing, the locking means, generally designated by reference character 17$^f$, comprises a key or hook-shaped portion 18$^{f'}$ at one end 18$^f$ of the spring follower ring, for cooperation with a slot or key-way 19$^{f'}$ in the remaining end 19$^f$ of the spring follower ring. It will be apparent that the key 18$^{f'}$ is intended to fit into the slot or key-way 19$^{f'}$ for preventing the ends of the spring follower ring from becoming separated.

Any desired cross section, serving the purposes of the particular type of packing in which the members are intended to be incorporated, may be employed. However, I prefer to employ a ring which is of circular or segmental-circular cross section, as shown more clearly in Fig. 8 of the drawing. I prefer also to provide the spring follower ring 15 or its equivalent with means to prevent the follower ring from creeping or moving circumferentially in the piston groove or with respect to the packing ring itself. For this purpose I provide the spring follower ring 15 with rough portions or serrations 15' and 15''. The rough portions or serrations 15' and 15'' may be continuations of the same series of rough portions or serrations, and are provided along a single portion of the circumference of the spring follower ring 15, preferably adjacent the split portion 16 thereof. The rough portions or serrations 15' serve to prevent the spring follower ring from creeping or moving circumferentially with respect to the piston groove 10', while the rough portions or serrations 15'' serve to prevent the spring follower ring from creeping or moving circumferentially with respect to the packing ring 13. In this way the packing as a whole, designated by reference character 11, is prevented from creeping or moving circumferentially in the piston groove 10'.

The manner of installing the piston packings described above is very simple and may be briefly summarized as follows: The spring follower ring is first inserted in the piston groove, and the ends of the same locked or hooked together. The packing ring is then slipped into the piston groove, over the follower ring, which is thereupon compressed by the packing ring while the piston carrying the packing or packings is inserted into the engine cylinder. It will be noted that during this operation the spring follower ring will not tend to jump out of the piston groove, but will be kept in place during the installation of the packing and thereafter. This same feature not only facilitates installation but also facilitates the shipment of the packings in the grooves of a piston.

During the operation of the engine neither the follower ring nor the packing ring will tend to creep or move circumferentially in the piston groove. Accordingly, the packing as a whole will be kept in proper position within the piston groove so as to prevent the split in the follower ring from becoming alined with the split in the packing ring, and thus preventing leakage through the packing.

As a result of the above construction there will be little chance of breaking the packing during installation, nor will the packing tend to spring out of true while being installed. The packing is tight and highly efficient, which, together with the ease with which it may be shipped and installed, renders the same commercially, as well as structurally and functionally, very valuable.

What I claim as my invention is:

1. The combination with a piston packing ring, having split ends and adapted to fit in the piston groove, of a split spring ring arranged beneath said packing ring and of less width than said piston groove, whereby to force the packing ring outwardly to engage the cylinder walls, said inner ring having reduced end portions on opposite faces, each having a head on an inner face, extending toward the reduced end for inter-engagement of the heads to inter-lock and limit the separation of the ring ends, the inner transverse engaging faces of the heads having a projection and a depression respectively for inter-engagement to prevent lateral separation of these end portions in said engaging position in the piston groove.

2. A piston packing for the groove of pistons, comprising a split ring provided with a substantially uniform surface in engagement with a substantially uniform surface of the piston groove, one of which said engaging surfaces is roughened at one or more places for frictional engagement without causing any separation or interlocking of such engaging walls at such places, whereby to prevent shifting of the ring in the piston groove in the circumferential direction.

3. A piston packing for the groove of pistons, comprising a split ring fitting in the groove to engage the cylinder wall, and a split spring ring arranged in the groove beneath said ring to force the latter outwardly against the cylinder walls, said inner ring being provided with a substantially uniform surface in engagement with a substantially uniform surface of the other ring, one of which said engaging surfaces is roughened at one or more places for frictional engagement without causing any separation or interlocking of such engaging walls at such places, whereby to prevent shifting of one ring relative to the other ring in the circumferential direction of the rings.

4. A piston packing for the grooves of pistons, comprising a split ring fitting in the groove to engage the cylinder wall, and a split spring ring arranged in the groove beneath said ring to force the latter outwardly against the cylinder walls, said inner ring being provided with a substantially uniform surface in engagement with a substantially uniform surface of the other ring, one of which said engaging surfaces is roughened at one or more places for frictional engagement without causing any separation or interlocking of such engaging walls at such places, whereby to prevent shifting of one ring relative to the other ring in a circumferential direction of the rings, the side wall of the inner ring and the engaging side wall of the piston groove being provided with a substantially uniform surface that is roughened at one or more places for frictional engagement without causing separation or interlocking of such engaging walls, whereby to prevent shifting of the inner ring in the piston groove in a circumferential direction.

5. A piston packing for the grooves of pistons, comprising a split ring of right triangular cross section and having one of the right angle sides bearing against one side of the groove and the other right angle side adapted to engage the cylinder wall, and a split inner ring of semi-circular cross section having its curved side bearing against said ring, said inner ring being roughened in spots to engage the packing ring and piston frictionally.

6. A piston packing for the grooves of pistons, comprising a split ring of right triangular cross section and having one of the right angle sides bearing against one side of the groove and the other right angle side adapted to engage the cylinder wall, and split inner ring having its curved side bearing against said packing ring, and also having a straight side bearing against the opposite side wall of the said piston groove, said inner ring being roughened at one more places for frictional engagement with said walls to prevent creeping of the rings.

7. A piston packing for the grooves of pistons, comprising a split ring of right triangular cross section and having one of the right angle sides bearing against one side of the groove and the other right angle side adapted to engage the cylinder wall, and a split inner spring ring having its opposite sides bearing against said ring and against the opposite side wall of the piston groove, said inner spring ring being roughened on said bearing sides to prevent creeping of the rings.

In testimony whereof I have signed my name to this specification this 28th day of February, 1923.

FRANK E. SMALL.